United States Patent
Tago (10) Patent No.: US 9,998,006 B2
(45) Date of Patent: Jun. 12, 2018

(54) DC-DC CONVERTER WITH COMPLEMENTARILY DRIVEN SWITCHING ELEMENTS

(71) Applicant: Murata Manufacturing Co., Ltd., Nagaokakyo-shi, Kyoto-fu (JP)

(72) Inventor: Masanari Tago, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days. days.

(21) Appl. No.: 15/273,950

(22) Filed: Sep. 23, 2016

(65) Prior Publication Data

US 2017/0012532 A1 Jan. 12, 2017

Related U.S. Application Data (63) Continuation of application No. PCT/JP2015/057810, filed on Mar. 17, 2015.

(30) Foreign Application Priority Data

Mar. 24, 2014 (JP) .................................. 2014-060224

(51) Int. Cl.
*H02M 3/158* (2006.01)
*H02M 3/156* (2006.01)
(Continued)

(52) U.S. Cl.
CPC ........... *H02M 3/158* (2013.01); *H02M 1/088* (2013.01); *H02M 3/156* (2013.01);
(Continued)

(58) Field of Classification Search
CPC ...... H02M 1/088; H02M 1/4225; H02M 3/07; H02M 3/073; H02M 3/156; H02M 3/158; H02M 3/1584; H02M 2003/077
See application file for complete search history.

(56) References Cited

U.S. PATENT DOCUMENTS 7,602,156 B2* 10/2009 Weng .................. H02M 3/1584
   323/222
2010/0259241 A1* 10/2010 Cuk ...................... H02M 3/005
   323/311

(Continued)

FOREIGN PATENT DOCUMENTS

CN 202586748 U 12/2012
CN 103051182 A 4/2013
(Continued)

OTHER PUBLICATIONS

A High Step-Up Converter With a Voltage Multiplier Module for a Photovoltaic System, Kuo-Ching Tseng, Chi-Chih Huang, and Wei-Yuan Shih, IEEE Transactions on Power Electronics, vol. 28, No. 6, Jun. 2013 http://ieeexplore.ieee.org/abstract/document/6294453/.*

(Continued)

*Primary Examiner* — Fred E Finch, III
*Assistant Examiner* — Rafael O De Leon Domenech
(74) *Attorney, Agent, or Firm* — Keating & Bennett, LLP (57) ABSTRACT

A DC-DC converter includes n number of first series circuits each including an inductor and a switching element and a second series circuit in which n number of rectifier elements are connected in series with a same rectification direction. When n=2, one end of the second series circuit is connected to a node between an inductor and a switching element in the first series circuit and the other end of the second series circuit is connected to one end of a smoothing capacitor and one end of a load. A node between an inductor and a switching element is connected to a node between the rectifier elements via a capacitor. The odd-numbered switching element and the even-numbered switching element in the order of connection to the second series circuit are complementarily driven.

16 Claims, 9 Drawing Sheets

(51) Int. Cl.
  *H02M 1/088* (2006.01)
  *H02M 3/07* (2006.01)
  *H02M 1/42* (2007.01)
(52) U.S. Cl.
  CPC ........ *H02M 3/1584* (2013.01); *H02M 1/4225* (2013.01); *H02M 3/07* (2013.01); *H02M 3/073* (2013.01); *H02M 2003/077* (2013.01)

(56) References Cited

U.S. PATENT DOCUMENTS

| 2011/0095740 | A1* | 4/2011 | Mori | H02M 1/44 323/282 |
| 2012/0153916 | A1 | 6/2012 | Weinstein et al. | |
| 2014/0016368 | A1* | 1/2014 | Chandrasekaran | H02M 3/156 363/21.12 |
| 2014/0160815 | A1* | 6/2014 | Jeong | G05F 1/70 363/84 |
| 2014/0169049 | A1* | 6/2014 | Chandrasekaran | H02M 1/4225 363/84 |
| 2015/0138857 | A1* | 5/2015 | Ye | H02M 1/4225 363/89 |
| 2015/0214848 | A1* | 7/2015 | Umetani | H02M 3/07 363/21.12 |

FOREIGN PATENT DOCUMENTS

| JP | 10-323046 A | 12/1998 |
| JP | 2012-182871 A | 9/2012 |

OTHER PUBLICATIONS

English translation of Official Communication issued in corresponding International Application PCT/JP2015/057810, dated Jun. 9, 2015.
Official Communication issued in corresponding Chinese Patent Application No. 201580009547.0, dated Jan. 29, 2018.

* cited by examiner

| | | | | | | | | |
|---|---|---|---|---|---|---|---|---|
| Q1-Gate | OFF | ON | OFF | ON | OFF | ON | OFF | ON |
| Q2-Gate | ON | OFF | ON | OFF | ON | OFF | ON | OFF |
| Q3-Gate | OFF | ON | OFF | ON | OFF | ON | OFF | ON |
| STATE | 1 | 2 | 1 | 2 | 1 | 2 | 1 | 2 |

FIG. 9

DC-DC CONVERTER WITH COMPLEMENTARILY DRIVEN SWITCHING ELEMENTS

CROSS REFERENCE TO RELATED APPLICATIONS

This application claims the benefit of priority to Japanese Patent Application No. 2014-060224 filed on Mar. 24, 2014 and is a Continuation Application of PCT Application No. PCT/JP2015/057810 filed on Mar. 17, 2015. The entire contents of each application are hereby incorporated by reference.

BACKGROUND OF THE INVENTION

1. Field of the Invention

The present invention relates to a DC-DC converter that boosts a direct-current input voltage and outputs a resultant voltage.

2. Description of the Related Art

A charge pump boosting circuit that uses a capacitor and diodes is commonly used as a DC-DC converter for which an input power supply voltage is low and having a relatively small current-carrying capacity. Japanese Unexamined Patent Application Publication No. 10-323046 discloses a power supply circuit including a rectangular wave generation circuit and a circuit for performing voltage doubling rectification upon a rectangular wave output from the rectangular wave generation circuit using a capacitor and diodes.

A charge pump boosting circuit generates a voltage of a predetermined amplitude and smooths the voltage to generate a direct-current voltage in principle. The charge pump boosting circuit superimposes an alternating voltage (a square wave that is a switching waveform in normal cases) on the direct-current voltage and smooths a resultant voltage to generate a voltage of a double amplitude value.

A charge pump boosting circuit that uses a capacitor and diodes can boost a voltage with a simple circuit. However, the following problems arise.

Since voltage boosting is performed with only a capacitor and diodes, it is impossible to increase a charging/discharging current for the capacitor and respond to the demand for a large load current.

Since a circuit configuration is provided in which, after a direct-current voltage has been generated by smoothing, an alternating voltage is superimposed on the direct-current voltage, two diodes are always needed for voltage doubling rectification. Large losses therefore occur at the diodes.

Since a large pulsed current flows from the capacitor into a switching element, a large loss occurs at the switching element. The amount of heat generated in the switching element is therefore large and it is difficult to increase power conversion efficiency. In order to reduce a pulsed current, it is necessary to reduce the capacitance of the capacitor. In this case, however, it is difficult to output a large current.

SUMMARY OF THE INVENTION

Preferred embodiments of the present invention provide a low-heat-generating and high-power-conversion-efficiency DC-DC converter in which a load current is increased and losses at diodes and switching elements are low.

A preferred embodiment of the present invention provides a DC-DC converter in which n number of first series circuits each including an inductor and a switching element are connected in parallel between direct-current voltage input terminals, one end of a second series circuit including n number of rectifier elements connected in series to have the same rectification direction is connected to a node between the inductor and the switching element in one of n number of the first series circuits, a node between the rectifier elements in the second series circuit and a node between the inductor and the switching element in remaining (n−1) number of the first series circuits are connected via a capacitor, the other end of the second series circuit is connected to one end of a smoothing capacitor and one end of a load, and there is provided a switching control circuit that controls n number of the switching elements connected to n number of the rectifier elements so that an odd-numbered switching element and an even-numbered switching element in a connection order of the rectifier elements in the second series circuit are complementarily driven.

Thus, the odd-numbered switching element and the even-numbered switching element in n number of the switching elements in n number of the first series circuits are complementarily driven. Since a capacitor that connects an inductor and a switching element is charged/discharged each time the switching elements are complementarily driven, it is possible to increase a charging/discharging current. This leads to the increase in a load supply current. In addition, it is unnecessary to provide a rectifier diode used to generate a direct-current voltage by smoothing, the occurrence of a loss at the diode is eliminated.

The switching elements are preferably field effect transistors, for example. In this case, a conduction loss is able to be reduced.

The rectifier elements are preferably field effect transistors and the switching control circuit preferably drives the rectifier elements. In this case, a conduction loss is able to be reduced in the rectifier elements.

Each of the rectifier elements in the second series circuit and the switching element connected to an upstream side of the rectifier element in a connection order of the rectifier elements are preferably complementarily driven. In the case of this configuration, it is possible to use simple driving signals to drive a plurality of switching elements and a plurality of rectifier elements and simplify the configuration of the switching control circuit.

According to various preferred embodiments of the present invention, the total amount of charging/discharging current is able to be increased for a capacitor used for voltage boosting and a DC-DC converter including the capacitor is able to be used for a power supply having a large load supply current. In addition, in preferred embodiments of the present invention, the superimposition of an alternating voltage is performed not on a direct-current voltage obtained by smoothing but on an alternating voltage. A resultant alternating voltage is then rectified and smoothed. It is therefore unnecessary to provide a rectifier diode for generating a direct-current voltage by smoothing, and the occurrence of a loss at the diode is eliminated.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A plurality of preferred embodiments of the present invention will be described in detail below with reference to the accompanying drawings. In the drawings, the same reference numeral is used to represent the same component or the same part. The preferred embodiments are merely illustrative, and configurations according to different preferred embodiments may be partially exchanged or combined.

First Preferred Embodiment

Figure 1A:
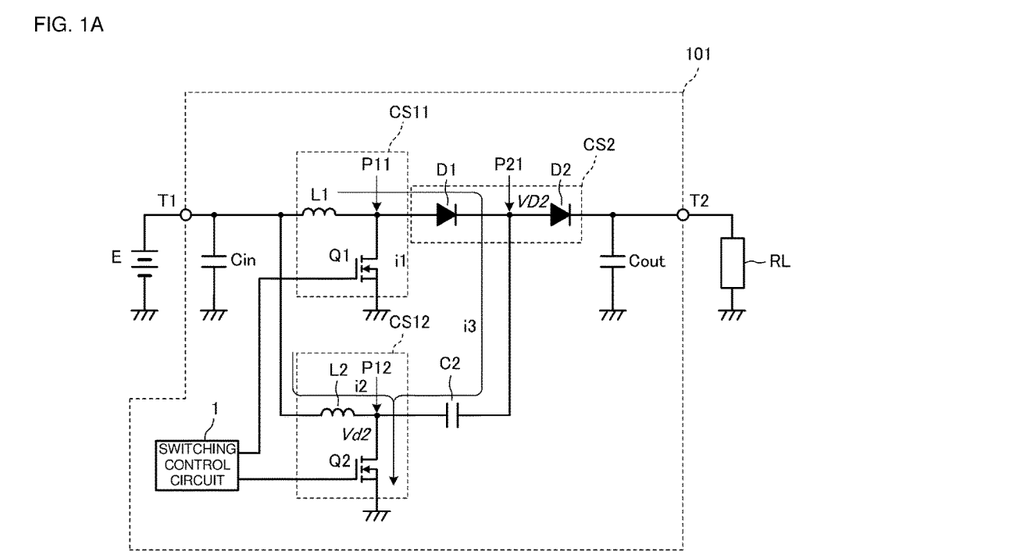
FIGS. 1A and 1B are circuit diagrams of a DC-DC converter 101 according to a first preferred embodiment of the present invention.
Figure 1B:
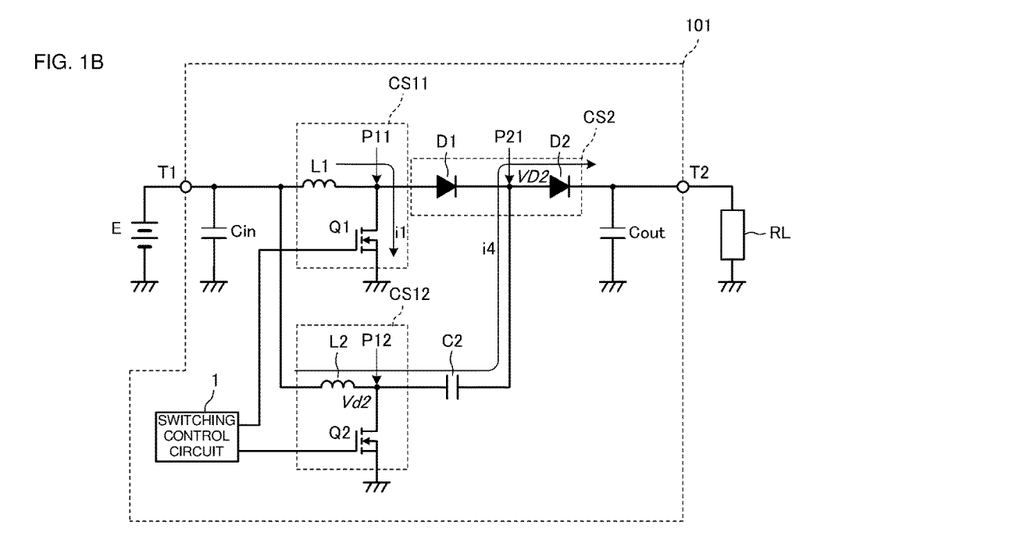

FIGS. 1A and 1B are circuit diagrams of a DC-DC converter 101 according to a first preferred embodiment of the present invention. The DC-DC converter 101 includes an input terminal T1 connected to a DC input power supply E and an output terminal T2 connected to a load RL. FIGS. 1A and 1B illustrate paths over which a current flows in the following two states.

The DC-DC converter 101 includes a capacitor Cin on an input side and a capacitor Cout on an output side. In addition, the DC-DC converter 101 includes first series circuits CS11 and CS12, that is, two first series circuits. The first series circuit CS11 includes an inductor L1 and a switching element Q1. The first series circuit CS12 includes an inductor L2 and a switching element Q2. The first series circuits CS11 and CS12 are connected in parallel between input terminals of a direct-current voltage E.

In the first series circuit CS11 that is one of the two first series circuits CS11 and CS12, a node P11 between the inductor L1 and the switching element Q1 is connected to one end of a second series circuit CS2 including two diodes D1 and D2. The diodes D1 and D2 are connected in series to have the same rectification direction.

A node P21 between the diodes D1 and D2 in the second series circuit CS2 and a node P12 between the inductor L2 and the switching element Q2 in the first series circuit CS12 that is the other one of the two first series circuits CS11 and CS12 are connected via a capacitor C2.

The other end of the second series circuit CS2 is connected to one end of the smoothing capacitor Cout and one end of the load RL.

The DC-DC converter 101 includes a switching control circuit 1. The switching control circuit 1 drives the switching elements Q1 and Q2 that are field effect transistors by outputting gate signals to the switching elements Q1 and Q2. The switching control circuit 1 complementarily drives the two switching elements Q1 and Q2 connected to the two diodes D1 and D2 in the connection order of the diodes D1 and D2 in the second series circuit CS2, that is, in the order of the first switching element Q1 and the second switching element Q2.

Figure 2:
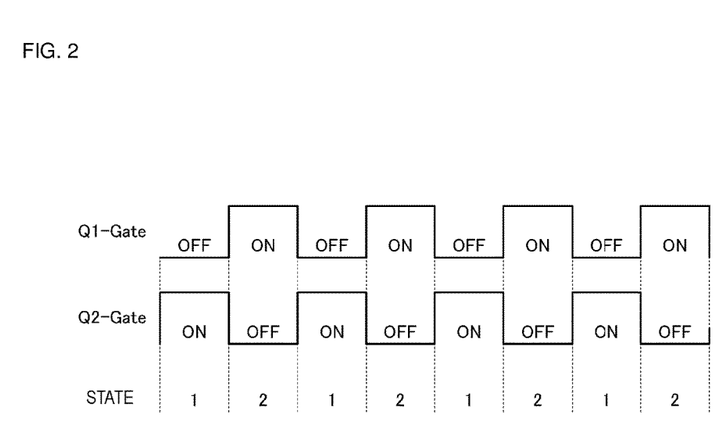
FIG. 2 is a waveform diagram of gate signals of switching elements Q1 and Q2 illustrated in FIGS. 1A and 1B.

FIG. 2 is a waveform diagram of gate signals of the switching elements Q1 and Q2 illustrated in FIGS. 1A and 1B. A two-phase driving signal is supplied to the switching elements Q1 and Q2. In this example, the first switching element Q1 and the second switching element Q2 are alternately turned on and off. In "State 1", the first switching element Q1 is turned off and the second switching element Q2 is turned on. In "State 2", the second switching element Q2 is turned off and the first switching element Q1 is turned on.

Figure 3:
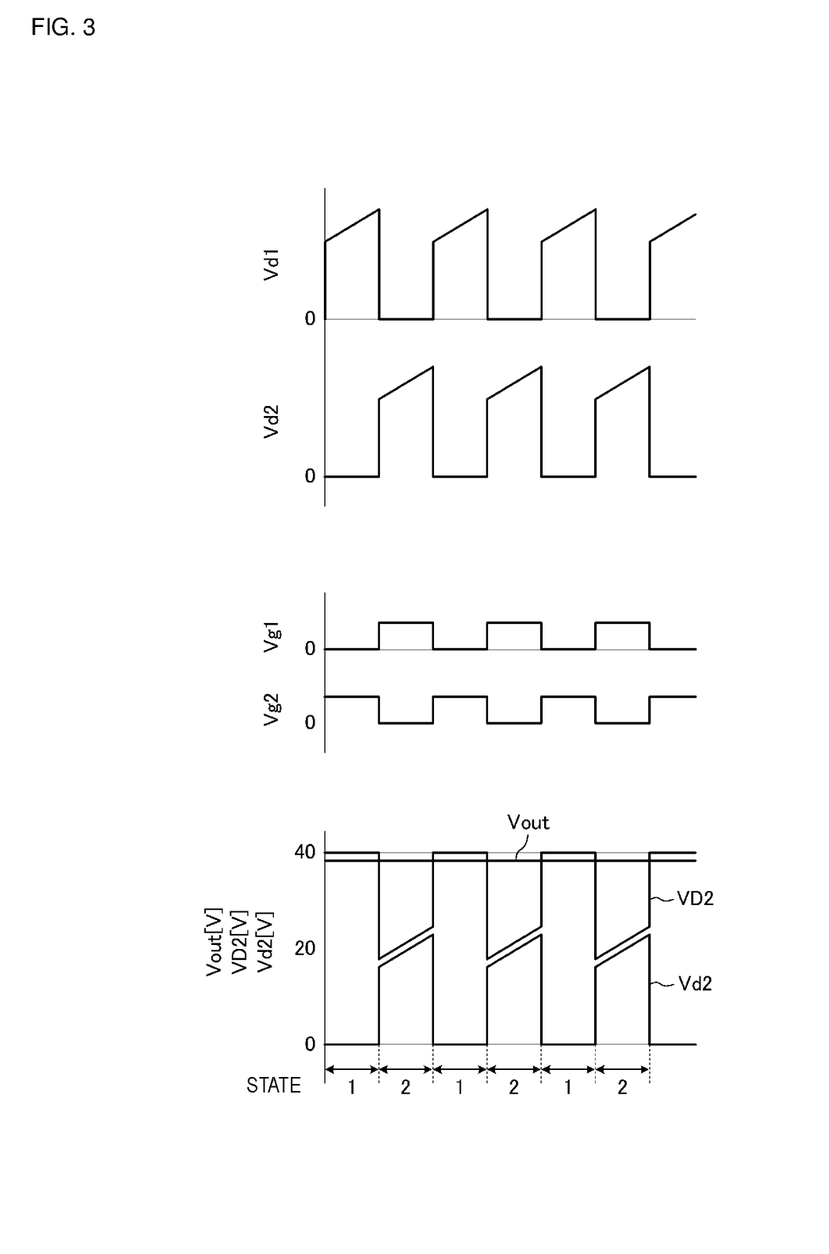
FIG. 3 is a waveform diagram of a voltage in each component illustrated in FIGS. 1A and 1B.

FIG. 3 is a waveform diagram of a voltage in each component illustrated in FIGS. 1A and 1B. The meaning of each reference sign in FIG. 3 is as follows.

vd1: The Drain Voltage of The Switching Element Q1
vd2: The Drain Voltage of The Switching Element Q2
vg1: The Gate Voltage of The Switching Element Q1
vg2: The Gate Voltage of The Switching Element Q2
VD2: The Anode Voltage of The diode D2
Vout: Voltage Output to Load Operations in the above-described states 1 and 2 are as follows.

State 1

When the switching element Q1 is turned off and the switching element Q2 is turned on, an exciting current i2 flows through the inductor L2 and a current i3 flows from the inductor L1 to the switching element Q2 via the diode D1 and the capacitor C2 as illustrated in FIG. 1A. As a result, exciting energy is output from the inductor L1 and the capacitor C2 is charged up.

State 2

When the switching element Q1 is turned on, the diode D1 is reverse-biased and an exciting current i1 flows through the inductor L1 as illustrated in FIG. 1B. Since the switching element Q2 is in the OFF state, a current i4 flows from the inductor L2 via the capacitor C2 and the diode D2. At that time, as illustrated in FIG. 3, a voltage obtained by superimposing the charging voltage of the capacitor C2 on the drain voltage Vd2 of the switching element Q2 (the voltage of the inductor L2) is output.

Subsequently, "State 1" and "State 2" are alternately repeated. By this operation, a boosting chopper circuit is defined by the diode D1 at the first stage in the connection order of diodes in the second series circuit CS2 and the first series circuit CS11 connected to the diode D1. At the time of release of energy from this boosting chopper circuit, the capacitor C2 connected to the diode D2 at the subsequent stage in the connection order of diodes in the second series circuit CS2 is charged up. At the time of release of energy from the inductor L2 in the first series circuit CS12 connected to the capacitor C2, a voltage obtained by superimposing the voltage of the capacitor C2 on the voltage of the inductor L2 is output. This voltage is smoothed by the smoothing capacitor Cout and is then supplied to the load RL. As a result, a voltage that is twice the voltage generated by a single boosting chopper circuit is output. In the example illustrated in FIG. 3, a single boosting chopper circuit generates about 20 V, and about 40 V that is twice the generated voltage is able to be output to a load, for example.

In a DC-DC converter in the related art in which, after a direct-current voltage has been generated by smoothing, an alternating voltage is superimposed on the direct-current voltage, in a case where a boosting chopper circuit directly boosts a voltage, a switching element and a rectifier element which have withstand voltages higher than an output voltage are needed. In this preferred embodiment, however, since an alternating voltage is superimposed on an alternating voltage and a resultant voltage is smoothed to generate a direct-current voltage, a voltage lower than an output voltage is applied to a switching element and a rectifier element. It is therefore possible to select an element having a low withstand voltage and good characteristics.

In a case where an output voltage is controlled, the on-duty ratios of the switching elements Q1 and Q2 may be controlled by PWM control.

Second Preferred Embodiment

Figure 4A:
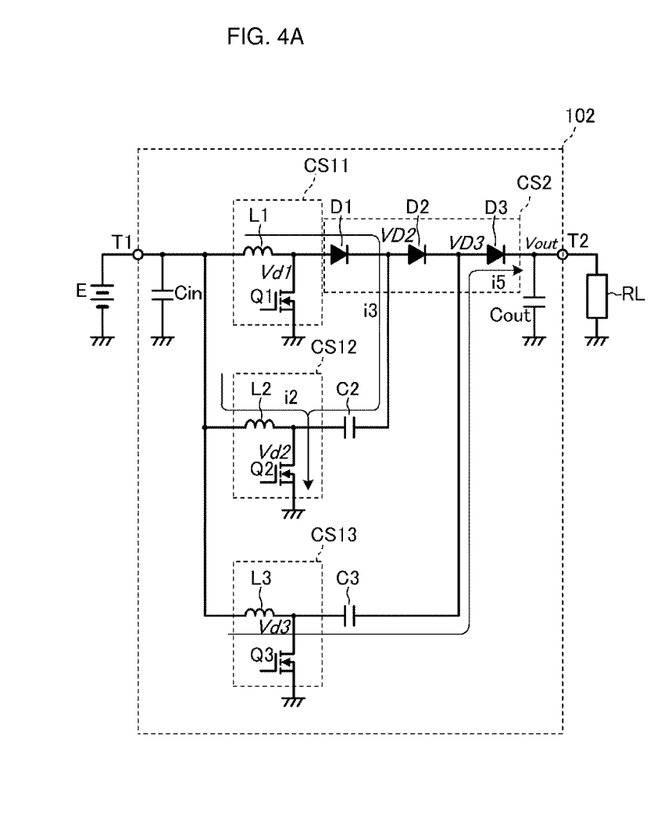
FIGS. 4A and 4B are circuit diagrams of a DC-DC converter 102 according to a second preferred embodiment of the present invention.
Figure 4B:
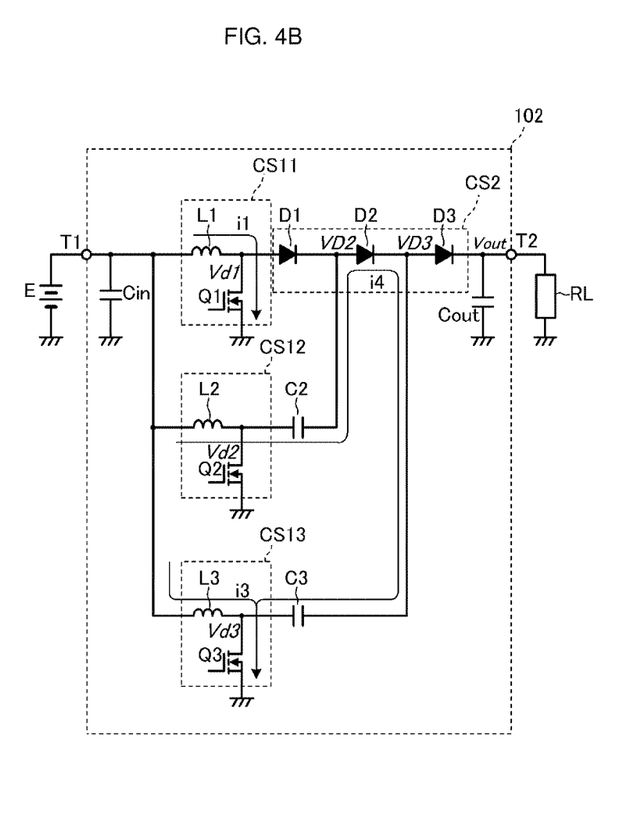

FIGS. 4A and 4B is a circuit diagram of a DC-DC converter 102 according to a second preferred embodiment of the present invention. The DC-DC converter 102 includes the input terminal T1 connected to the DC input power supply E and the output terminal T2 connected to the load RL.

The DC-DC converter 102 according to this preferred embodiment includes three first series circuits CS11, CS12, and CS13. In addition, the DC-DC converter 102 includes the second series circuit CS2 in which three diodes D1, D2, and D3 are connected in series.

Although a switching control circuit to drive switching elements Q1, Q2, and Q3 in the three first series circuits CS11, CS12, and CS13 preferably is connected to the switching elements Q1, Q2, and Q3, the illustration thereof is omitted in FIGS. 4A and 4B. The switching control circuit complementarily drives the odd-numbered switching elements Q1 and Q3 and the even-numbered switching element Q2 in the connection order of the diodes D1, D2, and D3 in the second series circuit CS2.

Figure 5:
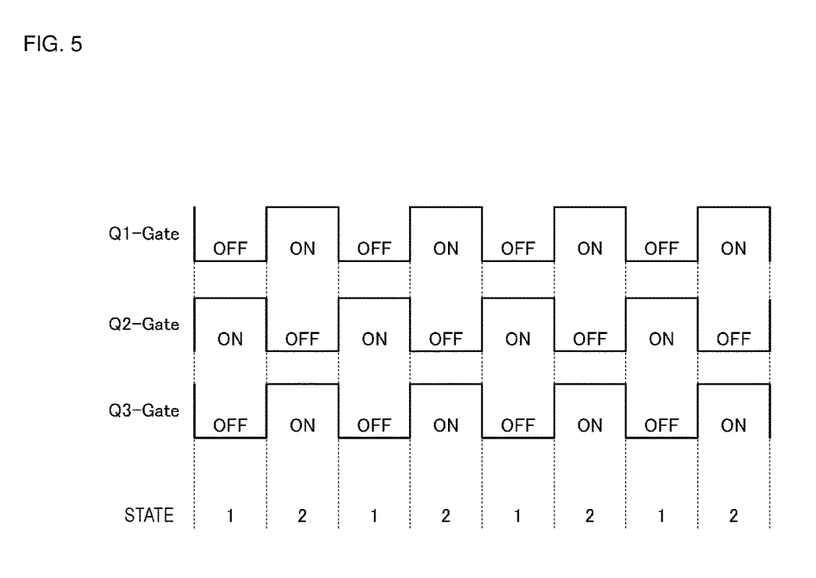
FIG. 5 is a waveform diagram of gate signals of switching elements Q1, Q2, and Q3 illustrated in FIGS. 4A and 4B.

FIG. 5 is a waveform diagram of gate signals of the switching elements Q1, Q2, and Q3 illustrated in FIGS. 4A and 4B. In this example, the switching elements Q1, Q2, and Q3 are alternately turned on and off with a duty ratio of 50%. In "State 1", the first switching element Q1 and the third switching element Q3 are in the OFF state and the second switching element Q2 is in the ON state. In "State 2", the second switching element Q2 is in the OFF state and the first switching element Q1 and the third switching element Q3 are in the ON state.

Figure 6:
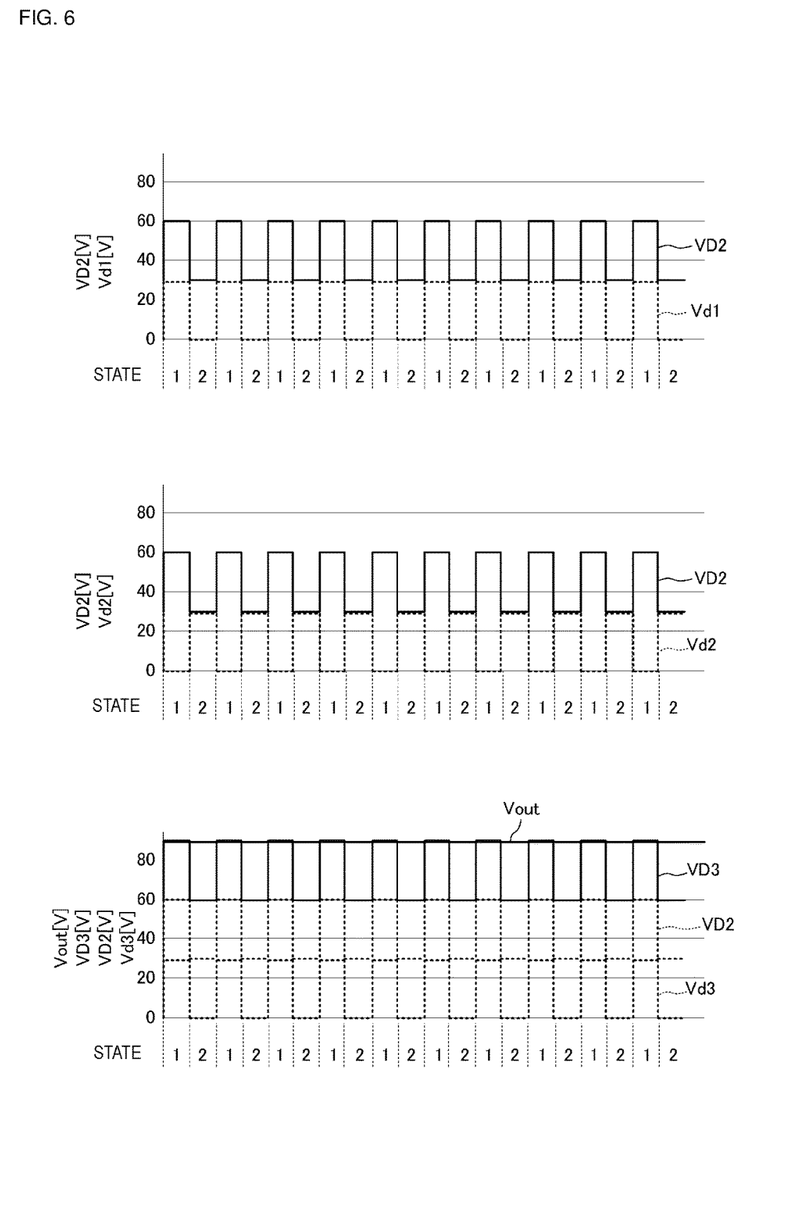
FIG. 6 is a waveform diagram of a voltage in each component illustrated in FIGS. 4A and 4B.

FIG. 6 is a waveform diagram of a voltage in each component illustrated in FIGS. 4A and 4B. The meaning of each reference sign in FIG. 6 is as follows.
vd1: The Drain Voltage of The Switching Element Q1
vd2: The Drain Voltage of The Switching Element Q2
vd3: The Drain Voltage of The Switching Element Q3
VD2: The Anode Voltage of The diode D2
VD3: The Anode Voltage of The diode D3
Vout: Voltage Output to Load Operations in the above-described states 1 and 2 are as follows. In a normal operation state, "State 1" and "State 2" are alternately repeated at regular intervals.
State 1
Since the switching element Q2 is in the ON state and the switching elements Q1 and Q3 are in the OFF state, the exciting current i2 flows through the inductor L2 as illustrated in FIG. 4A. Since the switching element Q1 is in the OFF state, the current i3 flows via the inductor L1, the diode D1, and the capacitor C2. As a result, the capacitor C2 is charged up. Since the switching element Q3 is in the OFF state, an exciting current i5 flows through an inductor L3. At that time, a voltage obtained by superimposing the charging voltage of a capacitor C3 (the capacitor C3 has been charged up by the operation of "State 2" to be described later in a previous period) on the voltage of the inductor L3 is output via the diode D3. At that time, the diode D2 is reverse-biased and is turned off.
State 2
Since the switching elements Q1 and Q3 are in the ON state and the switching element Q2 is in the OFF state, the current i4 flows from the inductor L2 to the capacitor C3 via the capacitor C2 and the diode D2 as illustrated in FIG. 4B. At that time, since the switching element Q3 is in the ON state, the capacitor C3 is charged up. As a result, exciting energy is released from the inductor L2, and the capacitor C3 is charged with the voltage of the capacitor C2. Since the switching elements Q1 and Q3 are on the ON state, the exciting current i1 of the inductor L1 and the exciting current i3 of the inductor L3 flow.

Subsequently, "State 1" and "State 2" are alternately repeated. By this operation, at the time of release of energy from the inductor L1 in the first series circuit CS11, the capacitor C2 in the first series circuit CS12 corresponding to the subsequent stage in the connection order of diodes in the second series circuit CS2 is charged up. At the time of release of energy from the first series circuit CS12, the voltage of the capacitor C2 is superimposed on the voltage of the capacitor C3 in the first series circuit CS13 corresponding to the subsequent stage in the connection order of diodes in the second series circuit CS2 and a resultant voltage is output. The resultant voltage is smoothed by the capacitor Cout and is then supplied to the load RL. As a result, a voltage that is three times the voltage generated by a single boosting chopper circuit is able to be output to a load.

In this preferred embodiment, since an alternating voltage is superimposed on an alternating voltage and a resultant voltage is smoothed to generate a direct-current voltage, a voltage lower than an output voltage is applied to a switching element. It is therefore possible to select an element having a low withstand voltage and good characteristics.

Third Preferred Embodiment

Figure 7:
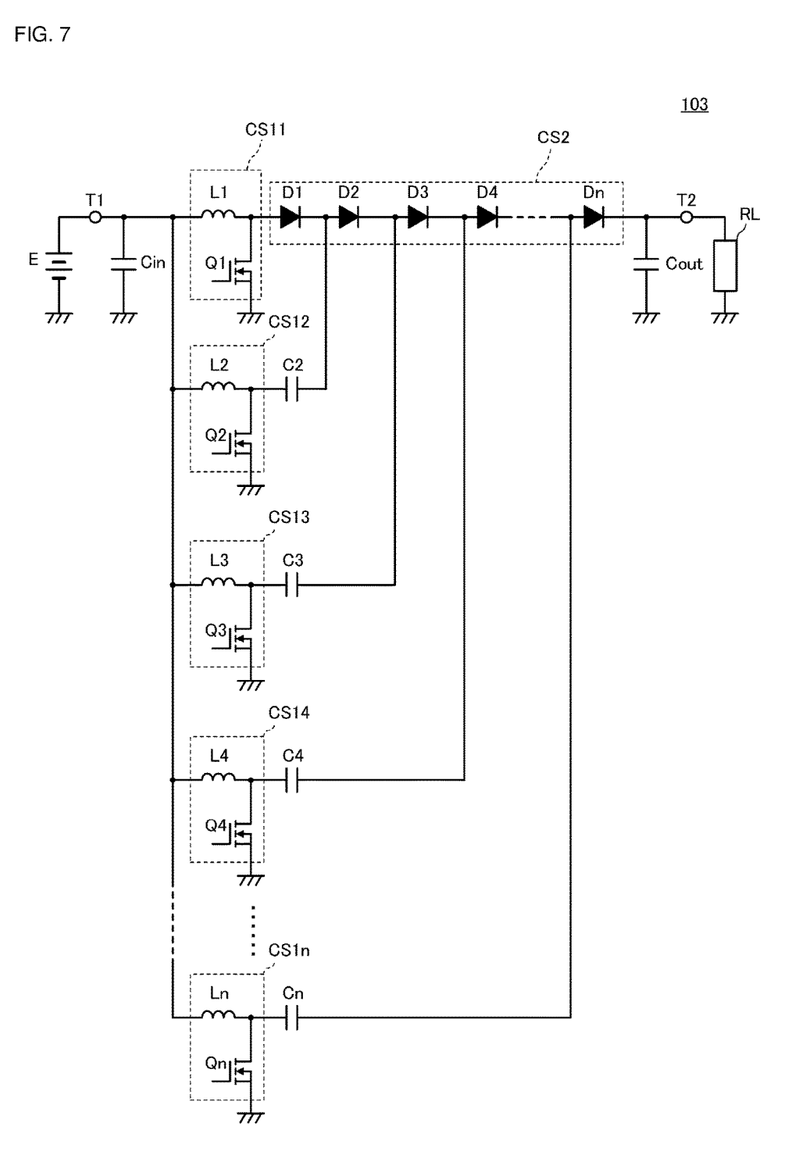
FIG. 7 is a circuit diagram of a DC-DC converter 103 according to a third preferred embodiment of the present invention.

FIG. 7 is a circuit diagram of a DC-DC converter 103 according to a third preferred embodiment of the present invention. The DC-DC converter 103 includes the input terminal T1 connected to the DC input power supply E and the output terminal T2 connected to the load RL.

The DC-DC converter 103 according to this preferred embodiment includes n number of first series circuits CS11, CS12, CS13, CS14, . . . and CS1n and the second series circuit CS2 in which n number of diodes D1, D2, D3, D4, . . . and Dn are connected in series.

A switching control circuit to drive switching elements Q1, Q2, Q3, Q4, . . . and Qn in n number of the first series circuits CS11, CS12, CS13, CS14, . . . and CS1n is connected to the switching elements Q1, Q2, Q3, Q4, . . . and Qn. The switching control circuit complementarily drives the odd-numbered switching elements Q1, Q3, etc. and the even-numbered switching element Q2, Q4, etc. in the connection order of the diodes D1, D2, D3, D4, . . . and Dn in the second series circuit CS2.

Like in the DC-DC converters according to the first and second preferred embodiments, in the DC-DC converter 103 according to this preferred embodiment, "State 1" and "State 2" are alternately repeated. By this operation, a voltage that is n times the voltage generated by a single boosting chopper circuit can be output to a load.

Fourth Preferred Embodiment

Figure 8A:
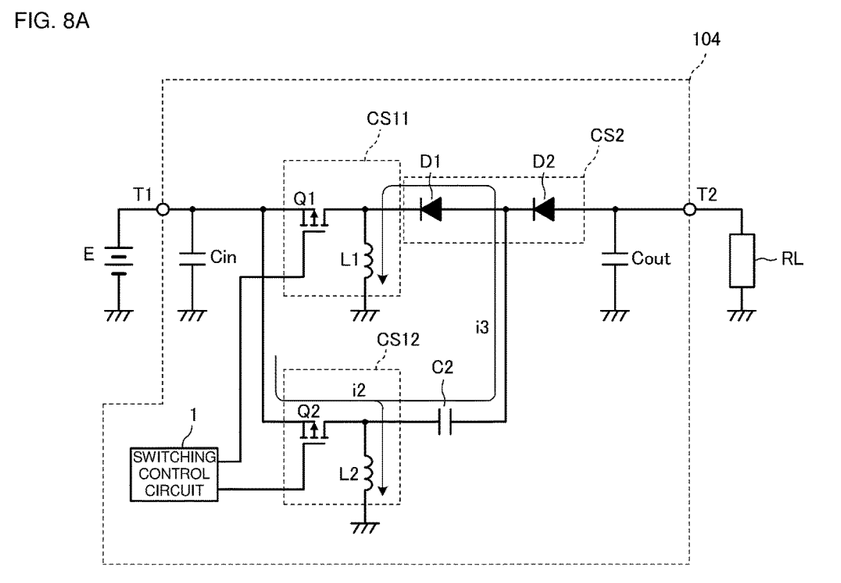
FIGS. 8A and 8B are circuit diagrams of a DC-DC converter 104 according to a fourth preferred embodiment of the present invention.
Figure 8B:
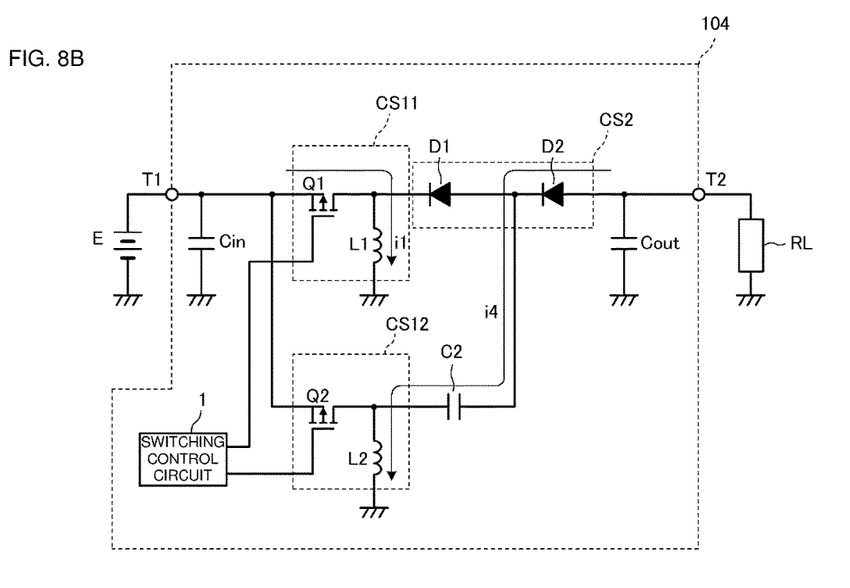

FIGS. 8A and 8B are circuit diagrams of a DC-DC converter 104 according to a fourth preferred embodiment of the present invention. The DC-DC converter 104 reverses the polarity of a voltage, boosts the voltage, and outputs a resultant voltage. The DC-DC converter 104 according to this preferred embodiment has a circuit configuration in which the positions of the inductor and the switching element in the DC-DC converter 101 according to the first preferred embodiment illustrated in FIGS. 1A and 1B are exchanged. That is, each chopper circuit has the configuration of an inverting converter.

The operation of the DC-DC converter 104 is as follows.
State 1

When the switching element Q1 is turned off and the switching element Q2 is turned on, the exciting current i2 flows through the inductor L2 as illustrated in FIG. 8A. The current i3 flows to the inductor L1 via the capacitor C2 and the diode D1. As a result, exciting energy is released from the inductor L1 and the capacitor C2 is charged up.
State 2

When the switching element Q1 is turned on, the diode D1 is reverse-biased and the exciting current i1 flows through the inductor L1 as illustrated in FIG. 8B. Since the switching element Q2 is in the OFF state, the current i4 flows to the inductor L2 via the diode D2 and the capacitor C2. At that time, a negative voltage obtained by superimposing the charging voltage of the capacitor C2 on the voltage of the inductor L2 is output to the output terminal T2.

Fifth Preferred Embodiment

Figure 9:
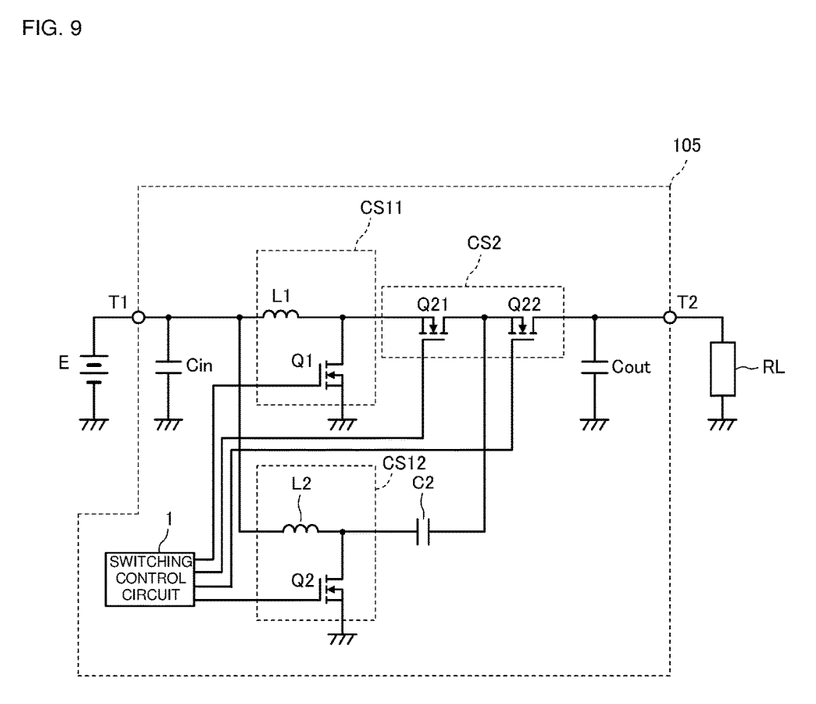
FIG. 9 is a circuit diagram of a DC-DC converter 105 according to a fifth preferred embodiment of the present invention.

FIG. 9 is a circuit diagram of a DC-DC converter 105 according to a fifth embodiment of the present invention. In the example described in the first preferred embodiment, the diodes D1 and D2 are provided as rectifier elements. In this preferred embodiment, rectifier elements Q21 and Q22 that are field effect transistors are provided. The switching control circuit 1 controls not only the switching elements Q1 and Q2 but also the rectifier elements Q21 and Q22. More specifically, the switching control circuit 1 complementarily drives switching elements connected to the upstream side of the rectifier elements Q21 and Q22 in the connection order of the rectifier elements Q21 and Q22. That is, the rectifier element Q21 and the switching element Q1 connected to the upstream side of the rectifier element Q21 are complementarily driven, and the rectifier element Q22 and the switching element Q2 connected to the upstream side of the rectifier element Q22 are complementarily driven. Accordingly, the rectifier element Q21 is turned on when the switching element Q2 is in the ON state, and the rectifier element Q22 is turned on when the switching element Q1 is in the ON state.

According to this preferred embodiment, it is possible to reduce conduction losses at the rectifier elements. In addition, the switching control circuit 1 is able to drive the switching elements Q1 and Q2 and the rectifier elements Q21 and Q22 using simple driving signals.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A DC-DC converter comprising:
n number of first series circuits each including an inductor and a switching element, the n number of the first series circuits being connected in parallel between direct-current voltage input terminals, n being an integer that is greater than or equal to 2;
a second series circuit including n number of rectifier elements connected in series to have a same rectification direction, a first end of the second series circuit being connected to a node between the inductor and the switching element in one of the n number of the first series circuits; and
a switching control circuit that controls the switching elements of the n number of the first series circuits connected to the n number of the rectifier elements so that an odd-numbered switching element and an even-numbered switching element of the switching elements of the n number of the first series circuits in a connection order of the n number of the rectifier elements in the second series circuit are alternately turned on and off with no overlap; wherein
a node between the n number of the rectifier elements in the second series circuit and a node between the inductor and the switching element in a remaining (n−1) number of the first series circuits are connected via a capacitor;
a second end of the second series circuit is connected to one end of a smoothing capacitor and one end of a load.

2. The DC-DC converter according to claim 1, wherein the switching elements of the n number of the first series circuits are field effect transistors.

3. The DC-DC converter according to claim 1, wherein the rectifier elements of the second series circuit are field effect transistors and the switching control circuit drives the rectifier elements.

4. The DC-DC converter according to claim 3, wherein each of the rectifier elements of the second series circuit and the switching element connected to an upstream side of the rectifier element in a connection order of the rectifier elements are complementarily driven.

5. The DC-DC converter according to claim 1, wherein the rectifiers of the second series circuit include diodes connected in series to have a same rectification direction.

6. The DC-DC converter according to claim 1, wherein the switching control circuit controls operation of the n number of the first series circuits and the second series circuit in a first state and in a second state which are alternately repeated.

7. The DC-DC converter according to claim 1, wherein the switching control circuit controls operation of the n number of the first series circuits and the second series circuit such that a boosting chopper circuit is defined.

8. The DC-DC converter according to claim 6, wherein the switching control circuit controls operation of the n number of the first series circuits and the second series circuit such that a voltage that is twice a voltage generated by the boosting chopper circuit is output.

9. The DC-DC converter according to claim 1, wherein the switching control circuit controls operation of the n number of the first series circuits and the second series circuit such that a second alternating voltage is superimposed on a first alternating voltage to produce a resultant voltage that is smoothed to generate an output voltage.

10. The DC-DC converter according to claim 1, wherein the n number of the first series circuits is two.

11. The DC-DC converter according to claim 1, wherein the n number of the first series circuits is three.

12. The DC-DC converter according to claim 1, wherein the second series circuit includes three diodes connected in series.

13. The DC-DC converter according to claim 1, wherein the switching control circuit turns on and off the odd-numbered switching element and the even-numbered switching element of the switching elements of the n number of the first series circuits with a duty ratio of 50%.

14. The DC-DC converter according to claim 1, wherein the DC-DC converter reverses a polarity of a voltage, boosts the voltage and outputs a resultant voltage.

15. The DC-DC converter according to claim 1, wherein the switching control circuit controls operation of the n number of the first series circuits and the second series circuit such that a boosting chopper circuit with an inverting converter configuration is defined.

16. The DC-DC converter according to claim 3, wherein the switching control circuit drives first and second groups of the rectifier elements in a complimentary manner.

* * * * *